Patented May 1, 1923.

1,453,844

UNITED STATES PATENT OFFICE.

DAVID KILGOUR, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed February 4, 1920. Serial No. 356,342.

*To all whom it may concern:*

Be it known that I, DAVID KILGOUR, a citizen of the United States, and a resident of Wilkinsburg, in the county of Allegheny and State of Pennsylvania, have made a new and useful Invention in Balancing Machines, of which the following is a specification.

This invention relates to balancing machines and particularly to machines adapted to be employed in ascertaining the weight distribution with relation to the axis of rotation of the body to be balanced.

Methods usually employed for obtaining static balance of rotatable bodies are not always accurate and may not disclose the fact that the gravity axis of the body does not coincide with the axis about which it is to be rotated. For example, the distribution of weight about the axis of rotation may not be symmetrical longitudinally or transversely of the axis, but it may be such that an improper distribution will not be disclosed by tests for static balance. The present methods of static balancing may not disclose a weight distribution in which the heavy spots are not in the same transverse plane, whereas rotation of the body will introduce a new and disturbing force. That is, the heavy spots are now subjected to centrifugal force, which of course acts radially, and as they are not in the same transverse plane, with relation to the axis of rotation, a couple is produced and vibration results. In order to dynamically balance the body the couple must be eliminated or counterbalanced, and it is necessary to find the intensity and direction of the resultant forces, or their equivalent, which occasion the couple, in order that they may be compensated, as for example, by introducing counterbalancing forces or couples. Obviously, if the disturbing forces are completely counterbalanced, the body will be in dynamic balance and consequently in static balance, since the gravity axis under such conditions will coincide with the axis of rotation.

An object of my invention is to produce a new and improved machine for indicating the direction and intensity of disturbing forces caused by the rotation of the body.

A further object is to produce a new and improved dynamic balancing machine in which the opposite ends of the body to be investigated are mounted in such a manner that the weight distribution longitudinally of the axis of rotation may be ascertained with sufficient accuracy to perfect the dynamic balance of the body.

A further object is to produce a new and improved dynamic balancing machine and a new and improved method of investigating dynamic balance or unbalance of rotating bodies.

A further object is to produce a new and improved dynamic balancing machine which may be employed for accurately determining the condition of dynamic balance or unbalance of a body without the necessity of first statically balancing the body.

A further object is to produce new and improved and adjusting and controlling mechanisms for balancing machines.

A further object is to produce a new and improved pedestal for balancing machines.

These and other objects which will be made apparent throughout the further description of my invention are attained by means of apparatus embodying the features herein described and illustrated in the drawings accompanying and forming a part hereof.

In the drawings: Fig. 1 is a diagrammatic sectional view of a balancing machine embodying my invention.

Fig. 3 is a sectional detail view of a portion of the weight shifting mechanism.

Figure 1:
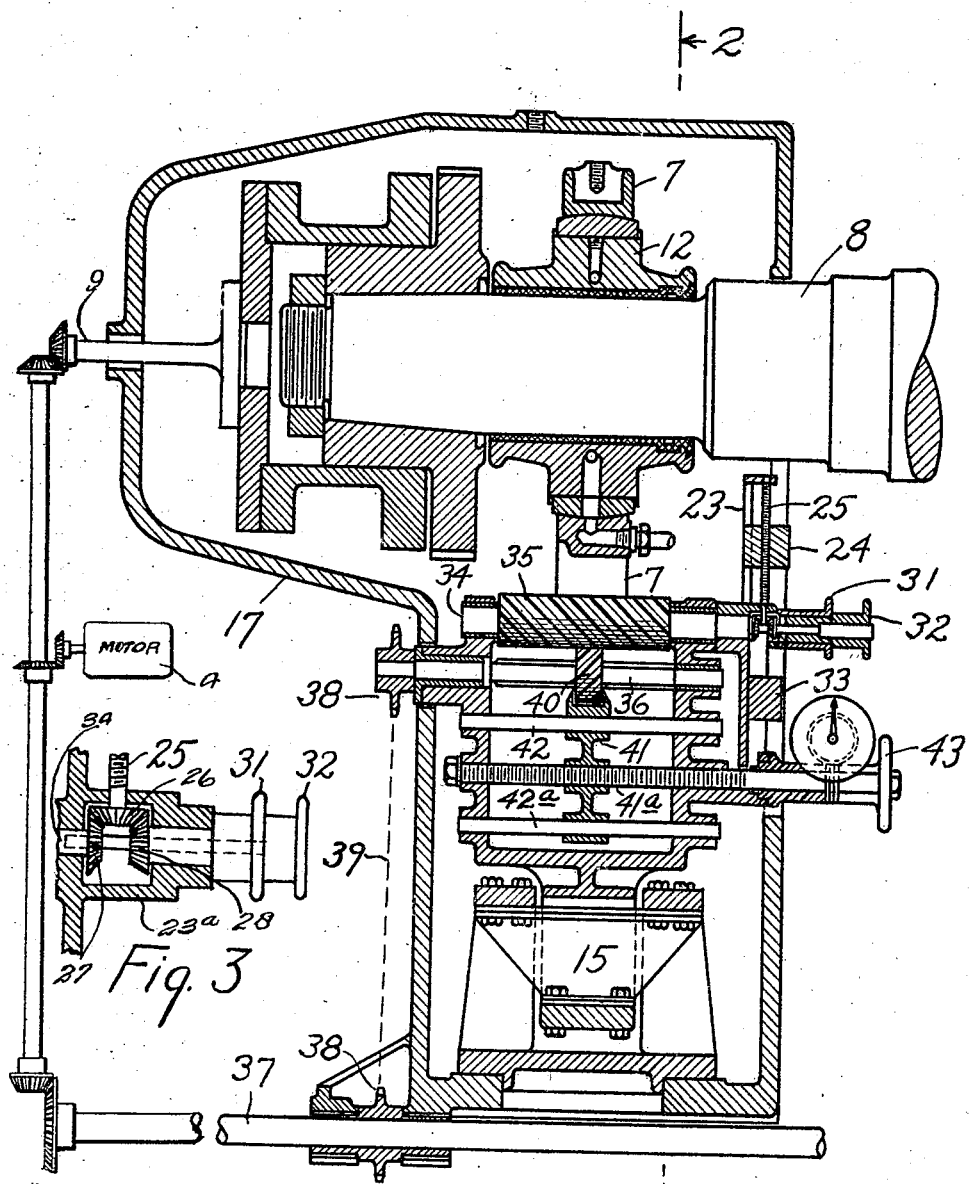
Figure 2:
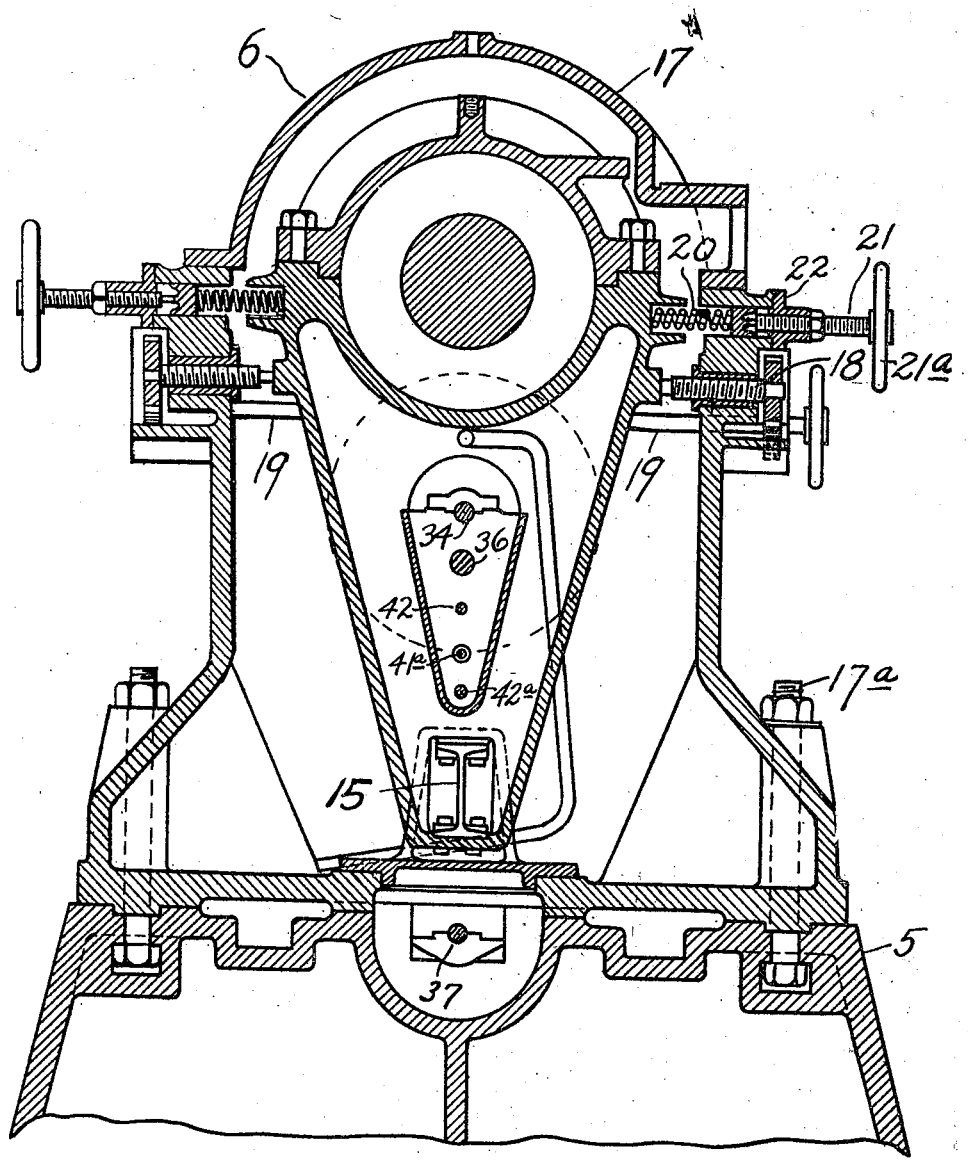
Fig. 2 is a diagrammatic sectional view along the line 2—2 of Fig. 1.

In Figs. 1 and 2 I have illustrated a balancing machine having a suitable base 5 and a pedestal 7 which, as shown, is slidably mounted on the base 5 and is adapted to support or partially support the body to be investigated for dynamic balance. As illustrated, one end of a turbine rotor 8 is mounted in the balancing machine in position to be investigated.

The rotor 8 may be rotated in any suitable manner, for example by means of a flexible shaft 9, operated from any suitable power source, for example, the motor 4.

As illustrated, the pedestal 7 is provided with a spherically seated bearing 12 in which one end of the shaft of the rotor 8 is journaled. As shown, the pedestal 7 is supported on an I-beam 15, which extends longitudinally of the rotor and is sufficiently flexible through its web portion to permit the upper ends of the pedestal to vibrate in a lateral plane, i. e., in a plane substantially at right angles to the axis of the rotor. As shown, the pedestal 7 is enclosed within a suitable housing 17, which does not interfere with the vibratory motion of the pedestal, and which encloses the working parts of the pedestal. The pedestal may be moved along the base 5 so as to accommodate rotors or other bodies of different lengths. While the housing 17 is likewise movable along the base it is adapted to be rigidly secured in place on the base, by means of bolts 17ª.

The vibrations or lateral movements of the upper end of the pedestal 7 may be limited by means of adjusting stops 18 mounted on the rigid housing 17. One stop is shown on each side of the pedestal. As shown, both stops 18 are adapted to be simultaneously operated by a shaft 19, which extends across the housing 17 and is geared to the stops in such a manner that a movement of one stop is accompanied by an equal and opposite movement of the other stop. I have also shown adjustable springs 20 mounted in the housing 17 and bearing against the opposite side of the pedestal 7 for the purpose of either damping or accentuating the vibration of the pedestal. As illustrated, the force of the springs may be adjusted by means of suitable screws 21 which I have shown provided with hand wheels 21ª. As illustrated, the screws 21 are mounted in caps 22 which may be removed for the purpose of changing the springs.

I have illustrated means associated with the pedestal 7 for counteracting the unbalanced forces or couples set up by the rotation of the rotor 8 during the operation of testing it for dynamic balance. This means includes a rotatable wheel or disc 23 mounted on the pedestal 7 and adapted to be rotated about an axis parallel to the axis of rotation of the rotor 8. An adjustable weight 24 is mounted on the disc 23, the weight being carried by a screw 25 so that it is capable of being moved radially toward and away from the center of rotation of the disc.

In Fig. 3, I have shown an enlarged view of a device suitable for adjusting the position of the weight 24 irrespective of whether the disc 23 is or is not rotating. As illustrated, the screw 25 terminates within the hollow interior of the hub 23ª of the disc and is provided at its inner end with a bevel gear 26 which is adapted to mesh with two other bevel gears 27 and 28. The bevel gears 27 and 28 are shown axially aligned with the axis of rotation of the disc 23 and meshing with opposite sides of the gear 26. As illustrated, the gear 27 is mounted on a shaft 29 which extends through a hollow shaft 30 on which the gear 28 is mounted. Both shafts 29 and 30 are, of course, aligned with the axis of rotation of the disc 23 and are respectively provided with hand wheels 31 and 32. As shown in Fig. 1, the hand wheels 31 and 32 are located in an easily accessible position outside of the pedestal housing 17, so that the radial position of the weight 24, with relation to the disc 23, may be easily adjusted. When the disc 23 is at rest either hand wheel 31 or 32 may be employed for shifting the position of the weight 24 in either direction. However, when the disc 23 is rotating, the screw 25 may be turned in one direction by holding the hand wheel 31 against rotation, and in the other direction by holding the hand wheel 32 against rotation. Thus the weight 24 may be moved outwardly with relation to the center of the disc by holding one hand wheel, and it may be moved inwardly by holding the other hand wheel. It will be apparent that with the arrangement of the gears 25, 26 and 27 illustrated both hand wheels 31 and 32 will normally tend to rotate with the disc 23, and that the adjustment of the weight 24, above described, may be accomplished by manually retarding one or the other hand wheel.

In Figs. 1 and 2, I have illustrated a fixed weight 33 mounted on the disc 23 for the purpose of counterbalancing the adjustable weight 24 when the latter is in its intermediate position. With the disc 23 rotating an unbalanced centrifugal force may be occasioned on either side of the disc by shifting the weight 24 in or out from its intermediate position; this of course destroys the counterbalance between the weights 24 and 33.

As illustrated, the disc 23 is mounted on a shaft 34, which is supported in suitable bearings mounted on the pedestal 7 and on which I have shown a spiral or helical gear 35. Below and parallel with the shaft 34, I have shown another shaft 36 which, as illustrated, is adapted to be driven by a lay shaft 37 through the agency of sprocket wheels 38 and a chain 39. Feathered on the shaft 36, I have shown a spiral or helical gear 40 which meshes with the gear 35 and therefore drives the disc 23. As shown, the gear 40 may be moved along the shaft 36 by means of a shifter 41. The shifter 41 is adapted to engage opposite sides of the gear 40 and is shown as mounted on two rods 42 and 42ª slidably mounted below and in parallel relation with the shafts 34 and 36. At an intermediate point the shifter 41 is engaged by a threaded shaft 41ª so that it may be shifted to different longitudinal positions by merely turning the shaft. A hand wheel 43 is shown on the outer end of the shaft 41ª for this purpose, and a worm driven pointer 44 and scale 45 indicates the angular position of the gear 40 with relation to the gear 35.

The lay shaft 37 is preferably driven at such a speed, relative to the speed of the rotor 8, that the rotor and the adjustable weight 24 operate in synchronism, that is, at the same speed. The angular relation between the rotor and the weight may be varied by means of the mechanism employed for shifting the longitudinal position of the gear 40. For example, the weight 24 may be shifted to a leading or lagging angular position relative to the rotor 8 by turning the hand wheel 43 so as to shift the gear 40 with relation to the gear 35 and thereby cause an angular advance or lag of the disc 23, and hence the weight 24. This results from the angular disposition of the teeth of the gears 40 and 35. It will, of course be understood that with the apparatus illustrated, the rotation of the rotor and the weight 24 is not synchronous during the short time the angular position of the weight is being altered.

In operation, the rotor 8 to be investigated for dynamic balance is first mounted in the machine and connected to suitable driving means by the flexible shaft 9. The adjustable weight 24 is preferably in its intermediate or counterbalanced position. The motor 4 is then started causing the rotor and the weight to rotate in synchronism. The stops 18 are then moved away from the pedestal and if the rotor is out of balance the pedestal will start to vibrate. The vibrations may be damped or accentuated by properly adjusting the springs 20.

In order to correct an unbalanced condition of the rotor, it is necessary to determine the angular position and the intensity of the disturbing forces or couples or of the resultant of the forces or couples. This is accomplished by shifting the position of the weight 24 both in angular and in radial directions, as necessary, until the vibrations of the pedestal or pedestals are reduced to a minimum or are substantially eliminated. This operation introduces counterbalancing forces or couples and results in a dynamic balance of the rotating parts of the balancing machine, including the rotor 8 as a part of the machine. It also definitely indicates the changes in weight distribution of the rotor 8 necessary to accomplish its dynamic balance. It is apparent that the apparatus indicates the intensity and direction of the disturbing forces or couples, since the radial position of each weight 24 with relation to its disc may be readily ascertained and the angular position of each weight with relation to the rotor 8 may also be ascertained by means of the pointer 44. The hand wheels 31 and 32 may be provided with cooperating scales to indicate the radial position of the weight 24 associated with them.

In practice the usual procedure is to provide two pedestals and to as nearly as possible eliminate the vibrations of one pedestal or the vibrations occasioned by one end of the rotor. The other end of the rotor is then balanced as near as posible. The latter operation usually introduces new forces which disturb the balance of the previously balanced end. The end first balanced is rebalanced until the vibrations of the supporting pedestal are reduced to a minimum and the operation is repeated, if necessary, until a satisfactory balance is obtained at both ends of the machine. Material is then added to or removed from different portions of the rotor, so as to accomplish the necessary distribution of weight in the rotor to place it in dynamic balance. After the rotor has been corrected, the weights 24 are again moved to their intermediate or counter-balanced positions, and the balancing operation is repeated for the purpose of ensuring correct balancing of the rotor.

While I have described and illustrated but one embodiment of my invention, it will be apparent to those skilled in the art that various changes, modifications, additions and omissions may be made in the apparatus described and illustrated without departing from the spirit and scope of the invention, as set forth by the appended claims.

What I claim is:

1. In combination in a balancing machine, a movable support on which the body to be balanced is rotatively mounted, means for rotating said body, a rotatable weight associated with said support and means for rotating said weight in synchronism with said body including a pair of intermeshing gears having inclined teeth, and means for moving one of said gears longitudinally with relation to the other to cause said weight to lead or lag with respect to said body during the period of operation of said means and while the body and weight are in motion.

2. In combination in a balancing machine, a movable support on which the body to be balanced is rotatively mounted, means for rotating said body, a rotatable weight associated with said support and means for rotating said weight in synchronism with said body including a pair of intermeshing gears having inclined teeth, and means for moving one of said gears longitudinally with relation to the other to cause said weight to lead or lag with respect to said body during the period of operation of said means and while the body and weight are in motion, and means for indicating the angular displacement of said weight with relation to said body.

3. In a balancing machine, a support for the body to be balanced and capable of vibrating in response to unbalanced forces exerted by the body when rotated, a revolvable weight associated with said support, means for revolving the weight, a screw for varying the radius at which the weight revolves, a gear on the end of said screw near the center of revolution, gears meshing on opposite sides of said gear and mounted with their axes coinciding with the axis of revolution and means for turning said last mentioned gears.

4. In a balancing machine, the combination of a pedestal member, a bearing carried by the pedestal member for a body to be balanced, a counterbalancing device carried by the pedestal member, flexible supporting means for the pedestal member, means for rotating the body and the counterbalancing device in synchronism, said counterbalancing device including mass means which may be adjusted radially or circumferentially, and means for adjusting the mass means while the body and the counterbalancing device are in motion.

5. In a balancing machine, the combination of supporting means for a body to be balanced, rotatable counterbalancing means, a source of power, transmission means between the source of power and the body and the counterbalancing device, the transmission means for the counterbalancing device including meshing gears having inclined teeth, means for shifting one of said gears in one direction or the other to cause said counterbalancing device to lead or lag with relation to said body, and indicating means operated by the shifting means to indicate the extent of lead or lag.

In testimony whereof, I have hereunto subscribed my name this 31st day of December, 1919.

DAVID KILGOUR.